(12) United States Patent
Luo et al.

(10) Patent No.: US 10,584,843 B2
(45) Date of Patent: Mar. 10, 2020

(54) LIGHT GUIDE ASSEMBLY FOR LIGHTING OR SIGNALING APPARATUS

(71) Applicant: Valeo Lighting Hubei Technical Center Co. Ltd, Wuhan (CN)

(72) Inventors: Ji Luo, Wuhan (CN); Pingwu Yang, Wuhan (CN); Haiqing Zhou, Wuhan (CN)

(73) Assignee: Valeo Lighting Hubei Technical Center Co. Ltd, Wuhan (CN)

( * ) Notice: Subject to any disclaimer, the term of this patent is extended or adjusted under 35 U.S.C. 154(b) by 93 days.

(21) Appl. No.: 15/433,287

(22) Filed: Feb. 15, 2017

(65) Prior Publication Data

US 2017/0241615 A1 Aug. 24, 2017

(30) Foreign Application Priority Data

Feb. 19, 2016 (CN) .......................... 2016 1 0093602

(51) Int. Cl.
*F21V 5/02* (2006.01)
*F21V 7/00* (2006.01)
(Continued)

(52) U.S. Cl.
CPC ............. *F21S 43/235* (2018.01); *F21S 43/14* (2018.01); *F21S 43/241* (2018.01); *F21S 43/249* (2018.01); *F21Y 2115/10* (2016.08)

(58) Field of Classification Search
CPC .. G02B 6/0028; G02B 6/0068; G02B 6/0021; G02B 6/0031; G02B 6/0038;
(Continued)

(56) References Cited

U.S. PATENT DOCUMENTS 4,389,698 A * 6/1983 Cibie ...................... F21S 41/24
362/511
5,136,480 A * 8/1992 Pristash ............... G02B 6/0005
362/23.15
(Continued)

FOREIGN PATENT DOCUMENTS

CN 1900579 A 1/2007
CN 104864338 A 8/2015
(Continued)

OTHER PUBLICATIONS

Office Action dated Feb. 15, 2019, in Chinese Patent Application No. 201610093602.5 (with English-language translation).
(Continued)

*Primary Examiner* — Arman B Fallahkhair
(74) *Attorney, Agent, or Firm* — Oblon, McClelland, Maier & Neustadt, L.L.P.

(57) ABSTRACT

The present disclosure provides a light guide assembly. The assembly includes: a light guide body part having a light exit face and a light distribution face; a first light incidence part having a first end and a second end on which at least one first light guiding unit is provided, the first light guiding unit being arranged to receive a first light and direct the first light into the light guide body part; a second light incidence part having a first end and a second end on which at least one second light guiding unit is provided, the second light guiding unit being arranged to receive a second light and direct the second light into the light guide body part, wherein the light distribution face is arranged to reflect the first/second light directed into the light guide body part towards the light exit face.

19 Claims, 5 Drawing Sheets

(51) Int. Cl.
*F21S 43/235* (2018.01)
*F21S 43/14* (2018.01)
*F21S 43/241* (2018.01)
*F21S 43/249* (2018.01)
*F21Y 115/10* (2016.01)

(58) Field of Classification Search
CPC ...... F21S 10/005; F21S 43/235; F21S 43/249; F21S 43/14; F21S 43/241
See application file for complete search history.

(56) References Cited

U.S. PATENT DOCUMENTS

| | | | | |
|---|---|---|---|---|
| 5,434,754 | A * | 7/1995 | Li | B60Q 1/0011 362/299 |
| 5,515,244 | A * | 5/1996 | Levins | G01D 11/28 116/202 |
| 6,497,505 | B2 * | 12/2002 | Oneil | B60Q 1/302 362/503 |
| 7,128,431 | B2 * | 10/2006 | Ludewig | G02B 6/04 362/23.09 |
| 7,419,287 | B2 * | 9/2008 | Gasquet | F21V 5/045 362/511 |
| 7,661,860 | B2 * | 2/2010 | De Lamberterie | B60Q 1/0052 362/516 |
| 9,337,373 | B2 * | 5/2016 | Morgan | H01L 31/18 |
| 9,574,734 | B2 * | 2/2017 | Sousek | F21S 48/215 |
| 9,684,110 | B2 * | 6/2017 | Bungenstock | G02B 6/0021 |
| 2015/0241616 | A1 | 8/2015 | Bungenstock | |
| 2015/0268398 | A1 | 9/2015 | Ohno et al. | |

FOREIGN PATENT DOCUMENTS

FR   3 003 928 A1   10/2014
JP   2008-277006   11/2008

OTHER PUBLICATIONS

European Search Report and Opinion dated Jun. 30, 2017, in European Patent Application No. 17 15 6605.

* cited by examiner

LIGHT GUIDE ASSEMBLY FOR LIGHTING OR SIGNALING APPARATUS

CROSS-REFERENCE TO RELATED APPLICATION

This application claims benefit of the Chinese Patent Application No. 201610093602.5, entitled with "LIGHT GUIDE ASSEMBLY AND LIGHTING AND/OR SIGNALING APPARATUS", filed with SIPO on Feb. 19, 2016, which is incorporated herein by reference in their entirety.

BACKGROUND OF THE DISCLOSURE

Field of the Disclosure

The present disclosure relates to a technical field of lighting and signaling, in particular, to a light guide assembly, and a lighting and/or signaling apparatus.

Description of the Related Art

A light guide is a light conducting component applied widely in various optical systems, for example, in a lamp, in particular in a vehicle lamp for an automobile vehicle. The light guide may conduct and control light in high efficiency. In practice, certain light guides may provide good illumination or decoration effects. As the society develops, customized and diversification requirements for the illumination or decoration effects increase gradually. However, in the prior art, the light guide typically has a single arrangement for receiving an inputted light, which may not satisfy such requirements.

SUMMARY

An embodiment of the present application provides a light guide assembly including:

a light guide body part having a light exit face and a light distribution face opposite to the light exit face;

a first light incidence part having a first end connected to an end of the light guide body part and a second end on which at least one first light guiding unit is provided, the first light guiding unit being arranged to receive a first light and direct the first light into the light guide body part via the first light incidence part;

a second light incidence part having a first end connected to the other end of the light guide body part and a second end on which at least one second light guiding unit is provided, the second light guiding unit being arranged to receive a second light and direct the second light into the light guide body part via the second light incidence part, wherein the light distribution face is arranged to reflect the first light directed into the light guide body part via the first light incidence part and/or the second light directed into the light guide body part via the second light incidence part, towards the light exit face.

In an embodiment, the first light incidence part and/or the second light incidence part are/is at an angle between 70 degrees and 180 degrees relative to the light guide body part.

In an embodiment, the first light incidence part and/or the second light incidence part are/is at an angle of 90 degrees relative to the light guide body part.

In an embodiment, the light guide assembly is provided with a first reflective guiding face at the position where the light guide body part is connected to the first light incidence part, the first reflective guiding face being arranged to receive the first light from the first light incidence part and reflect all or part of it towards the light distribution face; and/or the light guide assembly is provided with a second reflective guiding face at the position where the light guide body part is connected to the second light incidence part, the second reflective guiding face being arranged to receive the second light from the second light incidence part and reflect all or part of it towards the light distribution face.

In an embodiment, the first reflective guiding face is a portion of the first light incidence part or a portion of the light guide body part; and/or the second reflective guiding face is a portion of the second light incidence part or a portion of the light guide body part.

In an embodiment, the first reflective guiding face is substantially perpendicular to an angle-bisecting line of an angle formed by an incidence axis direction of the first light incident to the first light incidence part relative to the light exit face; and/or the second reflective guiding face is substantially perpendicular to an angle-bisecting line of an angle formed by an incidence axis direction of the second light incident to the second light incidence part relative to the light exit face.

In an embodiment, the light distribution face is provided with a prism array arrangement.

In an embodiment, the first light and the second light have different colors from each other.

In an embodiment, the first light incidence part, the second light incidence part and the light guide body part are integrally formed.

In an embodiment, at least one of the first light guiding unit and the second light guiding unit includes:

a light incidence side arranged to receive an incident light;

a reflective side on which a reflective face is arranged, the reflective face being arranged to reflect at least part of the light from the light incidence side towards the light guide body part, wherein the light incidence side is provided with a first incidence face and a second incidence face being arranged to receive a first part of the incident light and a second part of the incident light respectively and to collimate the first part of the incident light and the second part of the incident light in a plane along a first direction respectively, and wherein the first incidence face and the second incidence face have curve shapes and one of the first incidence face and the second incidence face is arranged to direct the first part or second part of the incident light corresponding to it towards the reflective face on the reflective side.

An embodiment of the present application also provides a lighting and/or signaling apparatus including:

a first light source arranged to emit a first light;

a second light source arranged to emit a second light;

a light guide assembly according to any one of claims 1-10.

In an embodiment, the first light source includes an array of first light emitting diodes, and the second end of the first light incidence part is provided with an array of the first light guiding units which is arranged corresponding to the array of first light emitting diodes; and/or the second light source includes an array of second light emitting diodes, and the second end of the second light incidence part is provided with an array of the second light guiding units which is arranged corresponding to the array of second light emitting diodes.

DETAILED DESCRIPTION OF PREFERRED EMBODIMENTS OF THE DISCLOSURE

Figure 1:
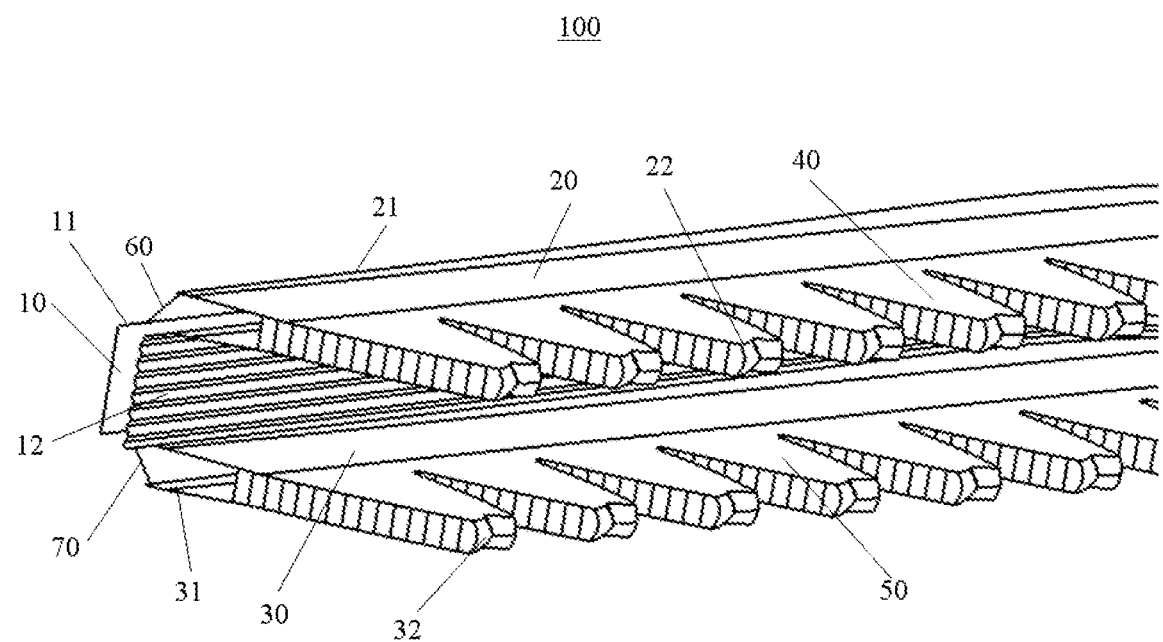
FIG. 1 is a schematic perspective view showing a light guide assembly according to an embodiment of the present application.
Figure 2:
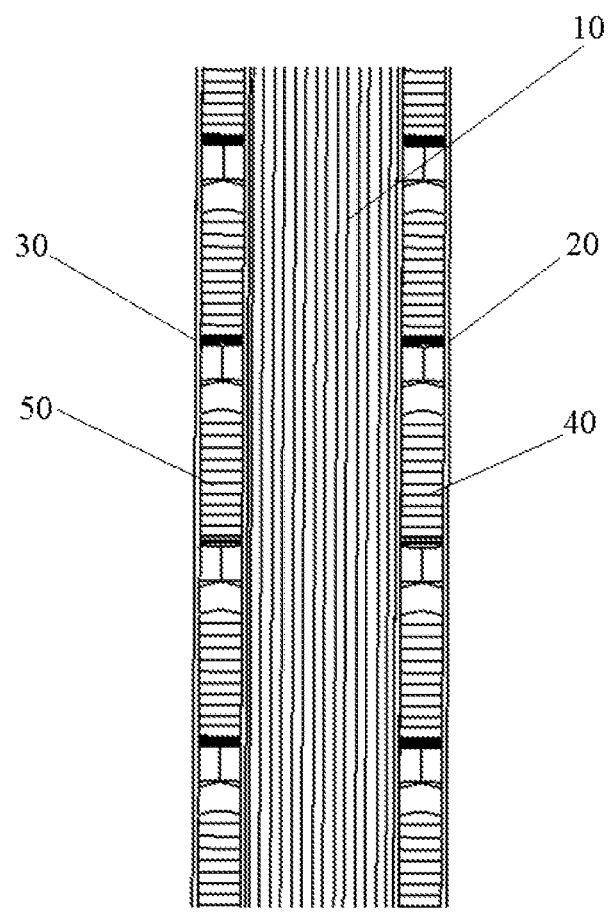
FIG. 2 is a schematic front view showing a light guide assembly according to an embodiment of the present application.

Embodiments of the present application will below be explained in details by ways of examples with reference to the accompanied drawings. Throughout the description, same or similar reference numerals represent same or similar parts. The following description of the embodiments with reference to the drawings is intended to explain the general inventive concept of the present application, instead of limiting to the present invention.

In accordance with a general concept of the present application, it provides a light guide assembly. It includes: a light guide body part having a light exit face and a light distribution face opposite to the light exit face; a first light incidence part having a first end connected to an end of the light guide body part and a second end on which at least one first light guiding unit is provided, the first light guiding unit being arranged to receive a first light and direct the first light into the light guide body part via the first light incidence part; a second light incidence part having a first end connected to the other end of the light guide body part and a second end on which at least one second light guiding unit is provided, the second light guiding unit being arranged to receive a second light and direct the second light into the light guide body part via the second light incidence part, wherein the light distribution face is arranged to reflect the first light directed into the light guide body part via the first light incidence part and/or the second light directed into the light guide body part via the second light incidence part, towards the light exit face.

In addition, in the following detailed description, for purposes of explanation, numerous specific details are set forth in order to provide a thorough understanding of the disclosed embodiments. It will be apparent, however, that one or more embodiments may be practiced without these specific details.

FIG. 1 is a schematic view showing a light guide assembly 100 according to an embodiment of the present application. The light guide assembly 100 includes: a light guide body part 10, a first light incidence part 20 and a second light incidence part 30. The light guide body part 10 has a light exit face 11 and a light distribution face 12 opposite to the light exit face 11. The first light incidence part 20 has a first end 21 connected to an end of the light guide body part 10 and a second end 22 on which at least one first light guiding unit 40 is provided. The first light guiding unit 40 is arranged to receive a first light 81 and direct the first light 81 into the light guide body part 10 via the first light incidence part 20. The second light incidence part 30 has a first end 31 connected to the other end of the light guide body part 10 and a second end 32 on which at least one second light guiding unit 50 is provided. The second light guiding unit 50 is arranged to receive a second light 82 and direct the second light 82 into the light guide body part 10 via the second light incidence part 30. The light distribution face 12 is arranged to reflect the first light 81 directed into the light guide body part 10 via the first light incidence part 20 and/or the second light 82 directed into the light guide body part 10 via the second light incidence part, towards the light exit face 11.

The light guide assembly in the above embodiment may receive and conduct different incident lights by light incidence parts on two ends of a light guide body part, so as to improve uniformity of illumination and to provide more plentiful illumination effects.

The term "light guide" in the embodiment of the present application may be understood as an optical component that can direct a light by internally total reflection in its interior (for example, the light is directed to an output from an input).

The light guide assembly as described in the above embodiment may receive and direct two beams of incident lights by two light incidence parts simultaneously. The two beams of incident lights may be a same light, or may be different lights from each other (for example, having different colors or different intensities of illumination from each other, and so on). As the beams are incident from both of two ends of the light guide body part, the light guide assembly may have more uniform exit light. Further, as the two beams of incident lights may have different properties from each other, the light guide body part may give an effect of one beam or a mixture effect of the two beams as required. It may improve diversification of the illumination effects.

In an example, the first light incidence part 20 and/or the second light incidence part 30 may be at a certain angle, for example an angle between 70 degrees and 180 degrees such as 90 degrees, relative to the light guide body part 10. It provides a plurality of selections for an incident direction of the incident light. When the angle is 90 degrees, the incident direction of the light (for example, a direction along an incidence axis) is substantially identical to the direction in which the light exits from the light exit face 11.

In an example, the light guide assembly 100 is provided with a first reflective guiding face 60 at a position where the light guide body part 10 is connected to the first light incidence part 20. And the first reflective guiding face 60 is arranged to receive the first light 81 from the first light incidence part 20 and reflect all or part of it towards the light distribution face 12. The first reflective guiding face 60 may be arranged such that the light from the first light incidence part 20 may be redirected when it enters the light guide body part 10. In this way, the light may have a different main travel direction in the first light incidence part 20, with respect to the main travel direction in the light guide body part 10. Thus, such arrangement allows the first light incidence part 20 and the light guide body part 10 may extend in different directions from each other, that is, a certain angle may be formed between them. It provides more selections for structure design of the light guide assembly.

Similarly, as an example, the light guide assembly 100 may also be provided with a second reflective guiding face 70 at the position where the light guide body part 10 is connected to the second light incidence part 30. And the second reflective guiding face 30 is arranged to receive the second light 82 from the second light incidence part 30 and reflect all or part of it towards the light distribution face 12. As an example, the first reflective guiding face 60 and/or the second reflective guiding face 70 may be total reflection face(s), which may improve optical reflection efficiency.

In an example, the first reflective guiding face 60 may be a portion of the first light incidence part 20 or a portion of the light guide body part 10. Similarly, the second reflective guiding face 70 may be a portion of the second light incidence part 30 or a portion of the light guide body part 10.

In an example, the first reflective guiding face 60 is substantially perpendicular to an angle-bisecting line of an angle formed by an incidence axis direction (indicated by X1 shown in FIG. 3) of the first light 81 incident to the first light incidence part 20 relative to the light exit face 11, for example, the angle between the first reflective guiding face 60 and the angle-bisecting line is between 80 degrees and 100 degrees, such as 90 degrees; and/or the second reflective guiding face 70 is substantially perpendicular to an angle-bisecting line of an angle formed by an incidence axis direction (indicated by X2 shown in FIG. 3) of the second light 82 incident to the second light incidence part 30 relative to the light exit face 11, for example, the angle between the second reflective guiding face 70 and the angle-bisecting line is between 80 degrees and 100 degrees, such as 90 degrees. Such arrangement may correctly direct the first light 81 incident into the first light incidence part 20 and/or the second light 82 incident into the second light incidence part 30 to a proper position in the light guide body part 10.

Figure 3:
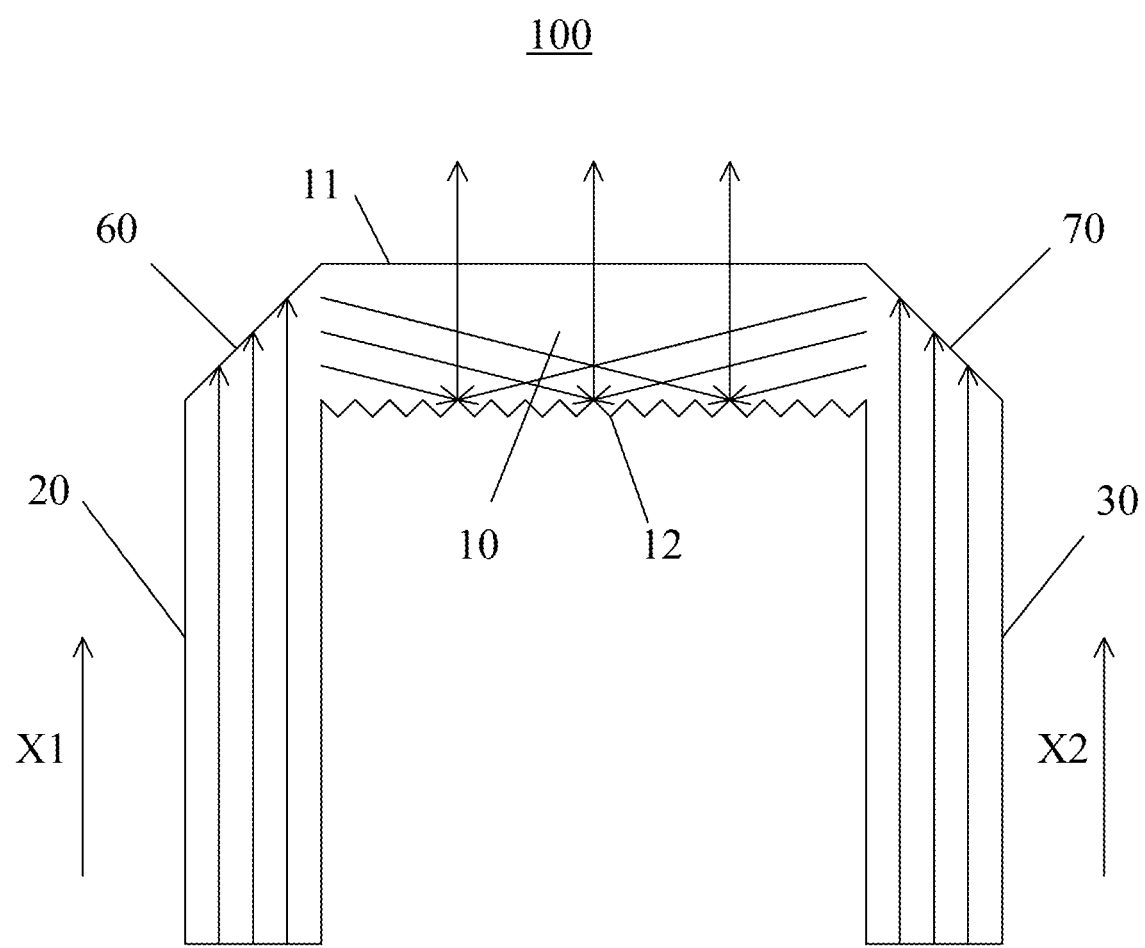
FIG. 3 shows schematically a work principle of the light guide assembly according to an embodiment of the present application.

It should be noted that FIG. 3 only schematically shows a general direction along which the light travels in the light guide assembly 100, but it does not mean that all of light must travel along the shown direction. For example, the light may have a certain angle of divergence in the first light incidence portion 20, the second light incidence portion 30 and the light guide body part 10.

In an example, the light distribution face 12 may be provided with a prism array arrangement, as shown in FIG. 3. The prism array arrangement may have a light diffusion effect, such that the light exiting from the light exit face 11 becomes more uniform. As an example, the light distribution face 12 may also be used to change the distribution of light intensity. For example, if it is desired that the light exiting from the light exit face 11 has a certain pattern distribution, the light distribution face 12 may be formed with corresponding pattern thereon to impart the pattern to the light passing by the light distribution face 12. The skilled person in the art should understand that the light distribution face 12 may also have other light distribution arrangements known in the art to achieve a desired light distribution effect.

In an example, the first light 81 and the second light 82 may have different colors from each other. In this way, the color of the light exiting from the light exit face 11 of the light guide body part 10 may be adjusted by controlling the inputted first light and second light. It may improve the convenience for adjusting the color of the outputted light. In an example, the first light incidence part 20, the second light incidence part 30 and the light guide body part 10 may be integrally formed. It may simplify the process for producing the assembly. And it may also improve optical efficiency because no interfaces between optical media are provided between respective portions of the assembly.

The exemplary structures of the first light guiding unit 40 and the second light guiding unit 50 will be explained below.

Figure 4:
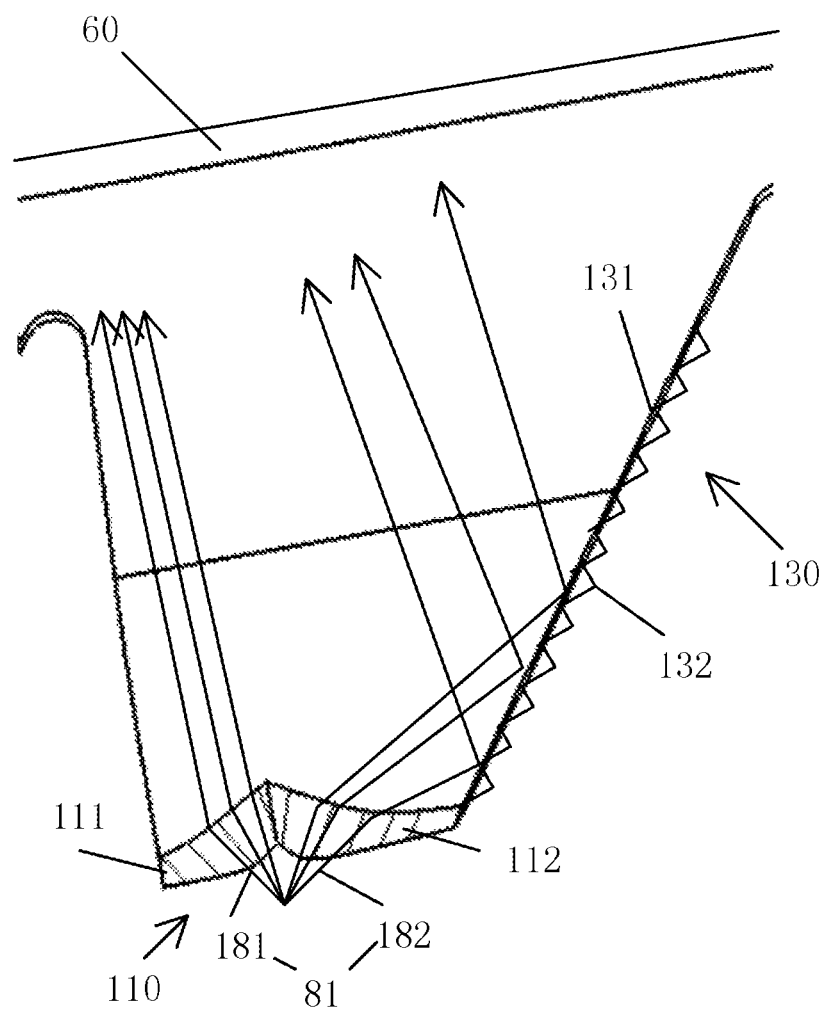
FIG. 4 is a schematic view showing a first light guiding unit according to an embodiment of the present application.

FIG. 4 shows the first light guiding unit 40 according to an embodiment of the present application. The first light guiding unit 40 includes: a light incidence side 110 arranged to receive an incident light (such as the first light 81); and a reflective side 130 on which a reflective face 131 is arranged. The reflective face 131 is arranged to reflect at least part of the light from the light incidence side 110 towards the light guide body part 10 (for example towards the first reflective guiding face 60). The light incidence side 110 is provided with a first incidence face 111 and a second incidence face 112. The first incidence face 111 and the second incidence face 112 are arranged to receive a first part 181 of the incident light and a second part 182 of the incident light respectively and to collimate the first part 181 of the incident light and the second part 182 of the incident light in a plane along a first direction respectively. The first incidence face 111 and the second incidence face 112 have curve shapes. The second incidence face 112 is arranged to direct the second part 182 of the incident light corresponding to it towards the reflective face 131 on the reflective side 130. It should be noted that, in the example shown in FIG. 4, it is the second incidence face 112 that directs the second part 182 of the incident light corresponding to it towards the reflective face 131 on the reflective side 130. However, in another example, the first incidence face 111 may also be arranged to direct the first part 181 of the incident light corresponding to it towards the reflective face 131 on the reflective side 130.

In the embodiment of the present application, the first incidence face 111 and the second incidence face 112 collimate the first part 181 of the incident light and the second part 182 of the incident light in a plane along the first direction (i.e., the direction perpendicular to the page in the example shown in FIG. 4) respectively. In this way, the first part 181 of the incident light and the second part 182 of the incident light are both converged into the first light guiding unit 40 in the first direction, so as to reduce the optical loss of the incident light. It is in particular advantageous when the first guiding unit 40 is in a form of sheet. In this circumstance, the above structure may prevent or reduce the incident light escaping from the top face and bottom face of the first light guiding unit 40 while being converged towards the light guide body part 10, so as to improve the optical efficiency and to enhance contrast.

In an example, in order to achieve the above collimation effects, the first incidence face 111 and the second incidence face 112 both have a shape in form of a cross section of convex lens in the plane along the first direction. It should be noted that the term "collimate" or "collimation" in the present application does not mean the collimated light must be parallel completely, but the first incidence face 111 and the second incidence face 112 have positive focal powers in the plane along the first direction and thus can at least converge the incident light passing through it to contract the divergent direction of the incident light. The extent in which the incident light is converged may be determined in accordance with the specific design requirements (for example, the thickness of the first light guiding unit 40 in the first direction).

By means of combination of the first incidence face 111 and the second incidence face 112, the incident light 180 may be received as large as possible, such that the incident light 180 diffuses uniformly in the first light guiding unit 40. The arrangement of the reflective face 131 may change the exit direction of the incident light from the first incidence face 111 and the second incidence face 112. In this way, not only uniform diffusion of the incident light in the first light guiding unit 40 may be ensured, but also the incident light can exit along a desired (for example substantially identical) direction whether it is incident from the first incidence face 111 or the second incidence face 112.

In an example, the first incidence face 111 and the second incidence face 112 may adjoin with each other and have different light guiding directions from each other. Two incidence faces having two different light guiding directions from each other are provided on the light incidence side 110, which may add the flexibility of design for the range of the diffusion angle of the light in the first light guiding unit 40. That is, the light is allowed to diffuse uniformly in a relatively large range of angle in the first light guiding unit 40.

In an example, as illustrated in FIG. 4, the first incidence face 111 is arranged to direct the first part 181 of the incident light towards the light guide body part 10 and the second incidence face 112 is arranged to direct the second part 182 of the incident light towards the reflective face 131 on the reflective side 130. In this circumstance, although the first incidence face 111 and the second incidence face 112 may direct the first part 181 of the incident light and the second part 182 of the incident light towards different directions respectively, the first part 181 of the incident light and the second part 182 of the incident light may exit in a substantially same direction finally and have uniform exiting intensity due to effects of the reflective face 131. Alternatively, in another example, the second incidence face 112 may also direct the second part 182 of the incident light towards the light guide body part 10 and the first incidence face 111 may direct the first part 181 of the incident light towards the reflective face 131 on the reflective side 130.

As discussed above, the shapes of the first incidence face 111 and the second incidence face 112 may be designed depending on a desired light deflection direction. An example for calculating the shape of the first incidence face 111 is given. At first, the angle by which the first incidence face 111 needs to deflect the first part 182 of the incident light may be determined depending on the desired uniformity of the exit light. The shape of the first incidence face 111 may be designed as an irregular curve surface, that is, respective light deflection angles may be independent at each point of the first incidence face 111. It may provide freedom as large as possible for optical design, so as to achieve better light uniformity. To this end, the first incidence face 111 may be divided into several units (such as small blocks) which have independent light deflection angles from each other, on other words, the first incidence face 111 may be considered to be formed by splicing a plurality of such units. For each unit on the first incidence face 111, the incident direction of the light and the direction in which the light leaves the first incidence face 111 may be set on the basis of the design target of light uniformity and optical principles (such as reflection law, refraction law). For example, the first incidence face 111 may be cut along a certain direction (for example, in the above first direction, or the horizontal direction, vertical direction) to obtain a curve profile. The plane in which the curve profile is placed may be defined as X-Y plane and the curve profile may be approximated by connecting a plurality of straight line section units one by one. The length of each of the straight line section units in X direction (or called as X step length) may be defined as $STEP_X$. The length of each of the straight line section units in Y direction (or called as Y step length) may be defined as $STEP_Y$. The ratio of $STEP_Y$ to $STEP_X$ is called as a slope SLP of the straight line section unit. If the slope of each of the straight line section units is determined, the shape of the curve profile may also be determined. If each of the straight line section units is sufficiently small, the shape of the curve profile may become substantially smooth. The above X step length and Y step length may be selected on the basis of the calculation accuracy, for example, may be 0.1 mm, 0.05 mm, 0.01 mm or the like.

The slope of the straight line section may be determined by optical laws. As an example, the slope of the straight line section may be calculated as the following equation:

$$SLP = \tan\left(-\arctan\left(\frac{\sin\theta}{-\frac{1}{n} + \cos\theta}\right) \times \frac{180}{\pi} + \alpha\right) \quad (1)$$

In the above equation (1), SLP is the slope of the straight line section unit, tan represents a tangent function, arctan represents an inverse tangent function, n is a refractive index of the light guiding unit, $\alpha$ is an incident angle of the first part of the incident light onto the straight line section, $\theta$ is a deflection angle of the incident light passing through the straight line section unit (i.e., the angle between the incident angle and the refraction angle), where the units of $\alpha$ and $\theta$ are degrees (°).

The shape of the above curve profile may be determined by solving the slope of the respective straight line section units one by one. In same way, the shape of the curve profile obtained by cutting the first incidence face 111 along another direction may also be solved. From the shapes of the plurality of curve profiles obtained by cutting the first incidence face 111 in a plurality of directions, the shape of the entire first incidence face 111 may further be solved. The divisions of the above straight line section units and selection of the curve profiles both may be set on the basis of the design precision and requirements.

The above only gives an example of calculating a shape of the first incidence face 111. In practice, the calculation process may need to adjust parameters repeatedly on the basis of the design of light distribution for calculation. The shape of the second incidence face 112 may be calculated in the same way as the described above. The details will be omitted below.

In an example, the first part 181 or the second part 182 of the incident light directed onto the reflective face 131 on the reflective side 130 may have an angle of divergence between 10 degrees to 70 degrees, for example, 30 degrees, 40 degrees.

As an example, the reflective face 131 on the reflective side 130 may be a total reflection face. It may efficiently improve the optical efficiency of the light traveling in the first light guiding unit 40. For the total reflection face, the shape and relative position of the reflective face 131 and the second incident face 112 (or the first incident face 111) may be arranged to allow the light from the second incident face 112 (or the first incident face 111) to meet total reflection condition at the reflective face 131.

In an example, the reflective face 131 on the reflective side 130 may be provided with optical stripes 132 thereon. The optical stripes 132 may increase the diffusion of the light in the first light guiding unit 40 to improve the uniformity in distribution of the exit light.

Although FIG. 4 only shows the reflective face 131 arranged on one reflective side 130 of the first light guiding unit 40, the first light guiding unit 40 may also be provided with the reflective face on another side opposite to the reflective side 130, such that the incident lights from the first incidence face 111 and the second incidence face 112 are respectively directed towards the light guide body part 10 through the reflection of the reflective faces on both sides. Such double reflective face arrangement may further improve the diffusion range and uniformity of the light in the first light guiding unit 40.

In an example, the first incidence face 111 and/or the second incidence face 112 have(has) a convex shape in a cross section in a plane perpendicular to the plane along the first direction (for example, in the example shown in FIG. 1, it is a plane parallel to the page). In the example, the first incidence face 111 and/or the second incidence face 112 not only have(has) collimation effects on the incident light in the plane along the first direction, but also have convergent effects on the light in the plane perpendicular to the plane along the first direction to some extent. It may provide more flexibility for the design of the first light guiding unit 40.

However, the curve shapes of the first incidence face 111 and the second incidence face 112 are not limited by this. They may be calculated out on the basis of the incident direction of the incident light on the first light guiding unit 40 and the desired exit direction and range of the exit light. As an example, the curve shapes of the first incidence face 111 and the second incidence face 112 may be formed by smooth curve surfaces, or may be spliced by a plurality of plane sections or curve sections. The latter may reduce the difficulty of production.

In an example, the first direction may be the thickness direction of the first light guiding unit 40, for example, the direction perpendicular to the page in FIG. 1. Such design will be in particular advantageous if the first light guiding unit 40 has a shape in a form of sheet.

By means of the first light guiding unit 40 according to an embodiment of the present application, the exit direction of the exit light may be deflected at any desired angle with respect to the direction of the incident light while the incident light is diffused uniformly. For example, the exit direction of the first light guiding unit 40 may be at an angle not greater than 75 degrees with respect to the axis direction of the incident light. It provides flexibility for arrangements of a light source or other optical elements in the lighting and/or signaling apparatus.

In the light guide assembly 100 according to an embodiment of the present application, a plurality of first light guiding units 40 may be arranged in parallel on the first light incidence part 20. In particular, in a system of multiple light sources, one first light guiding unit 40 may be provided for each light source (for example a light emitting diode). In this circumstance, the first light guiding unit 40 may allow the light emitted from the corresponding light source 201 to diffuse uniformly in it. Good light uniformity will also be maintained even at the position in which two adjacent first light guiding units 40 are connected.

All of the above exemplary embodiments for the first light guiding unit 40 may be applicable for the second light guiding unit 50. That is, at least one of the first light guiding unit 40 and the second light guiding unit 50 may have the exemplary structure as described in any one of the above embodiments.

Although the exemplary embodiments of the first light guiding units 40 and the second guiding units 50 are given in the above, the present application is not limited to this. They may also be implemented by other structures for directing light known in the art as long as it can achieve function of directing the first light and the second light to the light guide body part 10.

As an example, the light guide body part 10, the first light incidence part 20 or the second light incidence part 30 may be in a form of a planar light wave guide. The planar light wave guide is a light guide. Its thickness is smaller than its length and width. It may be bent and have a given curvature. The light wave guide has two large faces separated by a perimeter. The perimeter defines the thickness of the planar light wave guide. The thickness may be constant, or may be variable. For example, the thickness is reduced gradually from one end to the other end of the planar light wave guide. The surface in which the planar light wave guide extends may form a guiding surface for defining the light traveling by internally total reflection. However, this is only by way of examples. The embodiments of the present application are not limited to this.

By means of the above at least one embodiments of the present application, the light guide assembly can use the first incidence part and the second incidence part to receive and direct the first light and the second light respectively. It may improve uniformity of illumination and provide more plentiful illumination effects.

Figure 5:
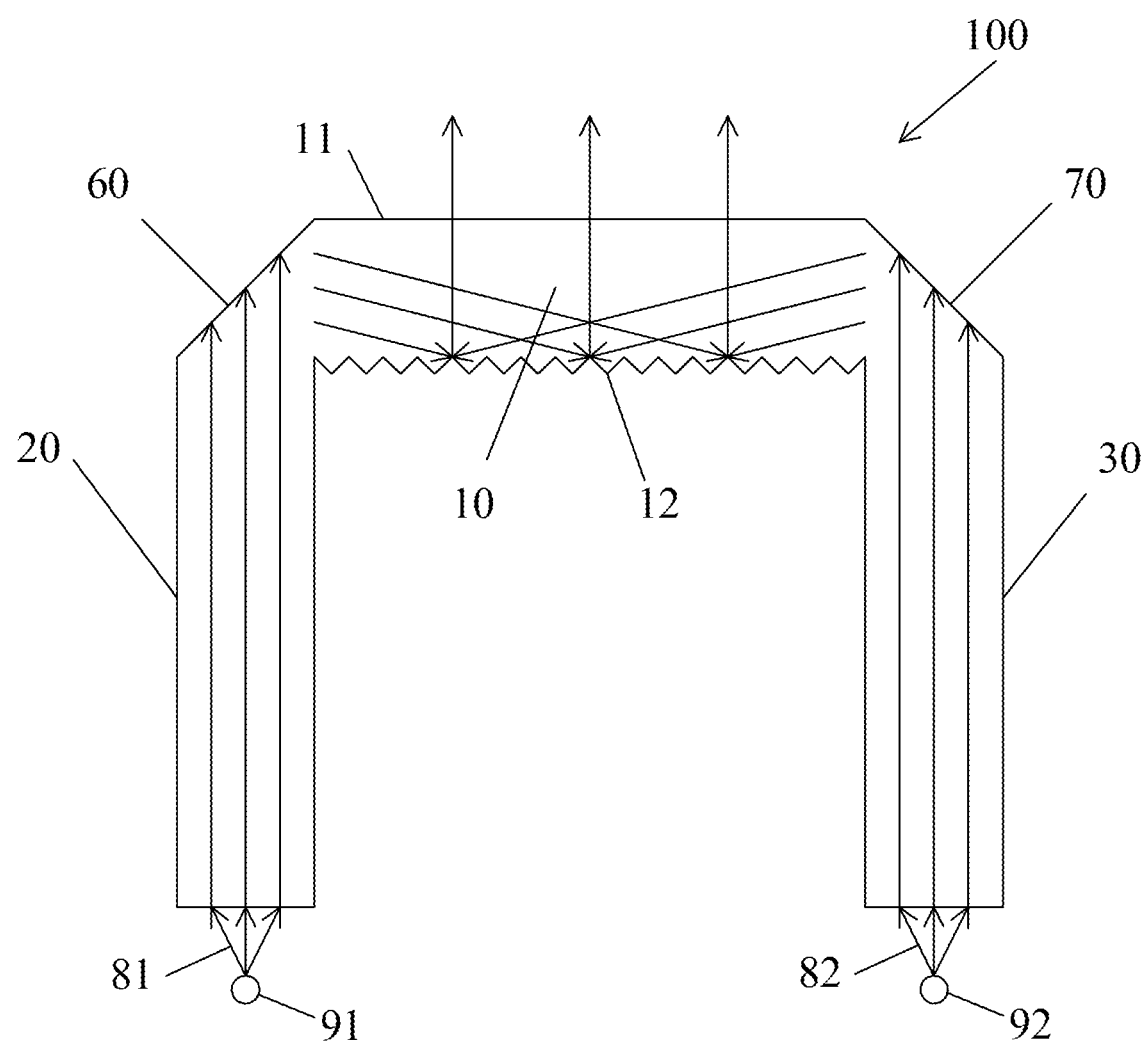
FIG. 5 is a schematic view showing a structure of a lighting and/or signaling apparatus according to an embodiment of the present application.

An embodiment of the present application also provides a lighting and/or signaling apparatus, as shown in FIG. 5. It includes: a first light source 91 arranged to emit a first light 81; a second light source 92 arranged to emit a second light 82; and the light guide assembly 100 as described in any one of the above embodiments. The first light incidence part 20 and the second incidence part 30 of the light guide assembly 100 are arranged to receive the first light 81 and the second light 82 respectively.

In an example, the first light source 91 includes an array of first light emitting diodes, and the second end 22 of the first light incidence part 20 is provided with an array of the first light guiding units 40 which is arranged corresponding to the array of first light emitting diodes; and/or the second light source 92 includes an array of second light emitting diodes, and the second end 32 of the second light incidence part 30 is provided with an array of the second light guiding units 50 which is arranged corresponding to the array of second light emitting diodes. That is, each light emitting diode in the array of first light emitting diodes and the array of second light emitting diodes corresponds to a first light guiding unit or a second light guiding unit. Because the light may be inputted from both the first light incidence part 20 and the second light incidence part 30, the power of the light emitting diodes in the array of first light emitting diodes and the array of second light emitting diodes may be lower with respect to the case that only one incidence part is used. Such arrangement of double light emitting diode arrays may also provide more flexibility for adjustment of the output intensity of the lighting and/or signaling apparatus.

The lighting and/or signaling apparatus in accordance with the present application may be used for lighting and signaling in vehicles, or may be used widely for other lighting and/or signaling applications, for example, an electric torch, a reflective plate for photograph.

The phrases "first", "second" in the present application are only used to distinguish components, instead of limiting the number of the components.

The present disclosure has been explained with reference to drawings. However, the examples shown in drawings are intended to illustrate the embodiments of the present application by way of examples, instead of limiting the present invention.

Although some of embodiments according to a general concept of the present application have been illustrated and explained, the skilled person in the art will understand that these embodiments may be modified without departing principles and spirits of the present application. The scope of the prevent invention will be defined by the appended claims and equivalent thereof.

What is claimed is:

1. A light guide assembly comprising:
    a light guide body part having a light exit face and a light distribution face opposite to the light exit face;
    a first light incidence part having a first end connected to an end of the light guide body part and a second end on which at least one first light guiding unit is provided, the first light guiding unit being arranged to receive a first light and direct the first light into the light guide body part via the first light incidence part;

a second light incidence part having a first end connected to the other end of the light guide body part and a second end on which at least one second light guiding unit is provided, the second light guiding unit being arranged to receive a second light and direct the second light into the light guide body part via the second light incidence part, wherein the light distribution face is arranged to reflect at least one of the first light directed into the light guide body part via the first light incidence part and the second light directed into the light guide body part via the second light incidence part, towards the light exit face, wherein at least one of the first light guiding unit and the second light guiding unit comprises:

a light incidence side arranged to receive an incident light;

a reflective side on which a reflective face is arranged, the reflective face being arranged to reflect at least part of the light from the light incidence side towards the light guide body part, wherein the light incidence side is provided with a first incidence face and a second incidence face being arranged to receive a first part of the incident light and a second part of the incident light respectively and to collimate the first part of the incident light and the second part of the incident light in a plane along a first direction respectively, and wherein the first incidence face and the second incidence face directly contact each other on the light incident side and both have curved shapes such that a plurality of points on each one of the first incidence face and the second incidence face have different light deflection angles from one another, the curved shapes are in a form of a cross section of a convex lens in two perpendicular planes along the first direction so as to converge divergent parts of the incident light, and one of the first incidence face and the second incidence face is arranged to direct the first part or second part of the incident light corresponding to it towards the reflective face on the reflective side.

2. An apparatus comprising:
a first light source arranged to emit a first light;
a second light source arranged to emit a second light;
a light guide assembly according to claim 1.

3. The apparatus according to claim 2, wherein the light guide assembly is provided with a first reflective guiding face at the position where the light guide body part is connected to the first light incidence part, the first reflective guiding face being arranged to receive the first light from the first light incidence part and reflect all or part of it towards the light distribution face; and the light guide assembly is provided with a second reflective guiding face at the position where the light guide body part is connected to the second light incidence part, the second reflective guiding face being arranged to receive the second light from the second light incidence part and reflect all or part of it towards the light distribution face.

4. The apparatus according to claim 3, wherein the first reflective guiding face is a portion of the first light incidence part or a portion of the light guide body part; and the second reflective guiding face is a portion of the second light incidence part or a portion of the light guide body part.

5. The apparatus according to claim 3, wherein the first reflective guiding face is substantially perpendicular to an angle-bisecting line of an angle formed by an incidence axis direction of the first light incident to the first light incidence part relative to the light exit face; and the second reflective guiding face is substantially perpendicular to an angle-bisecting line of an angle formed by an incidence axis direction of the second light incident to the second light incidence part relative to the light exit face.

6. The apparatus according to claim 2, wherein the first light source comprises an array of first light emitting diodes, and the second end of the first light incidence part is provided with an array of the first light guiding units which is arranged corresponding to the array of first light emitting diodes; and the second light source comprises an array of second light emitting diodes, and the second end of the second light incidence part is provided with an array of the second light guiding units which is arranged corresponding to the array of second light emitting diodes.

7. The apparatus according to claim 2, wherein at least one of the first light incidence part and the second light incidence part is at an angle between 70 degrees and 180 degrees relative to the light guide body part.

8. The apparatus according to claim 2, wherein at least one of the first light incidence part and the second light incidence part is at an angle of 90 degrees relative to the light guide body part.

9. The apparatus according to claim 2, wherein the light distribution face is provided with a prism array arrangement.

10. The apparatus according to claim 2, wherein the first light and the second light have different colors from each other.

11. The apparatus according to claim 2, wherein the first light incidence part, the second light incidence part and the light guide body part are integrally formed.

12. The light guide assembly according to claim 1, wherein the light guide assembly is provided with a first reflective guiding face at the position where the light guide body part is connected to the first light incidence part, the first reflective guiding face being arranged to receive the first light from the first light incidence part and reflect all or part of it towards the light distribution face; and the light guide assembly is provided with a second reflective guiding face at the position where the light guide body part is connected to the second light incidence part, the second reflective guiding face being arranged to receive the second light from the second light incidence part and reflect all or part of it towards the light distribution face.

13. The light guide assembly according to claim 12, wherein the first reflective guiding face is a portion of the first light incidence part or a portion of the light guide body part; and the second reflective guiding face is a portion of the second light incidence part or a portion of the light guide body part.

14. The light guide assembly according to claim 12, wherein the first reflective guiding face is substantially perpendicular to an angle-bisecting line of an angle formed by an incidence axis direction of the first light incident to the first light incidence part relative to the light exit face; and the second reflective guiding face is substantially perpendicular to an angle-bisecting line of an angle formed by an incidence axis direction of the second light incident to the second light incidence part relative to the light exit face.

15. The light guide assembly according to claim 1, wherein at least one of the first light incidence part and the second light incidence part is at an angle between 70 degrees and 180 degrees relative to the light guide body part.

16. The light guide assembly according to claim 1, wherein at least one of the first light incidence part and the second light incidence part is at an angle of 90 degrees relative to the light guide body part.

17. The light guide assembly according to claim 1, wherein the light distribution face is provided with a prism array arrangement.

18. The light guide assembly according to claim 1, wherein the first light and the second light have different colors from each other.

19. The light guide assembly according to claim 1, wherein the first light incidence part, the second light incidence part and the light guide body part are integrally formed.

* * * * *